United States Patent [19]

Osafune et al.

[11] Patent Number: 5,576,253

[45] Date of Patent: Nov. 19, 1996

[54] OXYNITRIDE GLASS, METHOD OF PREPARING THE SAME AND GLASS FIBER

[75] Inventors: Haruo Osafune; Satoshi Kitamura, both of Kyoto; Takashi Kawasaki, Ibaragi, all of Japan

[73] Assignees: Shimadzu Corporation, Kyoto; Asahi Fiber Glass Co. Ltd., Tokyo, both of Japan

[21] Appl. No.: 321,519

[22] Filed: Oct. 12, 1994

[30] Foreign Application Priority Data

Oct. 14, 1993 [JP] Japan .................................. 5-281688

[51] Int. Cl.$^6$ ...................................................... C03C 3/11
[52] U.S. Cl. ............................................... 501/56; 501/900
[58] Field of Search ........................................ 501/56, 900

[56] References Cited

U.S. PATENT DOCUMENTS

| | | | |
|---|---|---|---|
| 4,070,198 | 1/1978 | Chyung et al. | 501/56 |
| 4,141,739 | 2/1979 | Chyung et al. | 501/56 |
| 4,186,021 | 1/1980 | Chyung et al. | 501/56 |
| 4,222,760 | 9/1980 | Chyung et al. | 501/56 |
| 4,609,631 | 9/1986 | Messier et al. | 501/56 |
| 4,940,678 | 7/1990 | Aitken | 501/56 |
| 4,957,883 | 9/1990 | Kobayashi et al. | 501/56 |

*Primary Examiner*—Mark L. Bell
*Assistant Examiner*—Louis M. Troilo
*Attorney, Agent, or Firm*—Nikaido, Marmelstein, Murray & Oram LLP

[57] ABSTRACT

Transparent oxynitride glass has transmittance of at least 80%/mm in a wavelength region of 400 to 800 nm, with Si particles or Si alloy particles of not more than $1.0 \times 10^9 /cm^3$ in number. Glass fiber prepared by drawing this glass can attain strength which is by far superior to that of conventional oxide glass fiber, to be preferably applied to reinforcing fiber.

2 Claims, 1 Drawing Sheet

5,576,253

OXYNITRIDE GLASS, METHOD OF PREPARING THE SAME AND GLASS FIBER

BACKGROUND OF THE INVENTION

1. Field of the Invention

The present invention relates to oxynitride glass which is excellent in transparency and strength, and a method of preparing the same. Glass fiber which is prepared from the inventive glass is employed as reinforcing fiber for various composite materials such as FRP (fiber-glass reinforced plastics).

2. Description of the Background Art

In oxynitride glass, oxygen forming oxide glass is partially replaced by nitrogen having three bond valences. Thus, a larger number of chemical bonds are formed in the oxynitride glass as compared with the oxide glass, to strengthen the network of the glass. Thus, the oxynitride glass has excellent physical properties such as a high elastic modulus, high hardness and high strength, and is suitably applied to reinforcing fiber or the like.

In general, such oxynitride glass is prepared by a melting method of mixing a nitride raw material such as $Si_3N_4$ or AlN with another glass raw material of a metal oxide such as $SiO_2$ and melting the mixture in inert or reducing gas for a long time. However, conventional oxynitride glass which is prepared by melting under such environment easily causing reduction reaction is considerably colored and hazed with low transparency in a visible region of 400 to 800 nm, while its strength is inferior as compared with the expected physical value.

SUMMARY OF THE INVENTION

An object of the present invention is to provide oxynitride glass and oxynitride glass fiber which are remarkably superior in strength to the prior art.

The inventors have made deep study on improvement in physical properties of oxynitride glass and recognized that it is possible to obtain oxynitride glass and oxynitride glass fiber of an absolutely novel structure which are transparent and excellent in physical strength by employing specific preparation conditions, to complete the present invention.

The present invention provides oxynitride glass containing Si particles or Si alloy particles of at least 0.1 μm by not more than $1.0 \times 10^9/cm^3$ in number. The inventive glass has transmittance of at least 80%/mm at a wavelength of 400 to 800 nm, in particular. The present invention also provides a method of preparing such glass, and glass fiber.

According to the inventive method of preparing oxynitride glass, the following raw materials are first mixed with each other:

(i) $SiO_2$;

(ii) $Si_3N_4$ or another metal nitride;

(iii) at least one metal oxide; and (iv) CaO or CaO+MgO.

In place of $Si_3N_4$, the nitrogen source of the above item (ii) can be prepared from a metal nitride such as AlN, $Mg_3N$ or $Li_3N$, or an silicon oxy-nitride such as $Si_2N_2O$ or $Si_5N_6O$. Further, a metal oxy-nitride ($Al_{2n+1}O_{3n}N$ or the like), SIALON ($Si_{6-x}Al_xO_xN_{8-x}$ or the like), or a compound of an silicon oxy-nitride and a metal ($La_4Si_2O_7N_2$ or the like) may be employed.

The metal oxide of the above item (iii) can be prepared from $Al_2O_3$, BaO, $Sb_2O_3$, SrO, $Na_2O$, $K_2O$, $La_2O_3$, $CeO_2$, $Y_2O_3$, $ZrO_2$, $TiO_2$, $B_2O_3$, $Cr_2O_3$, PbO, $V_2O_5$ or $SnO_2$, or carbonate, hydroxide or oxalate for forming such a metal oxide by thermal decomposition may be blended. Further, a compound for forming CaO or MgO by thermal decomposition such as carbonate, hydroxide or oxalate may be employed in place of CaO or MgO.

The above raw materials are sufficiently mixed with each other, and the mixture is heated and melted to obtain oxynitride glass. The mixture is preferably melted at a temperature of 1400° to 1900° C. for 3 to 100 hours at a heating speed of 10° to 800° C./min. under an atmosphere of inert or reducing gas such as nitrogen or argon, to be glassified.

After such melting, the inventive oxynitride glass is refined at a prescribed temperature under an atmosphere of inert or reducing gas. The refinement temperature is 1400° to 1690° C., preferably 1500° to 1690° C. The refinement time is 1.0 to 100 hours, preferably 2 to 60 hours, and most preferably 4 to 6 hours.

Then, the oxynitride glass as obtained is quenched or slowly cooled. The oxynitride glass as cooled is drawn by a drawing machine which is heated to 1100° to 1600° C. under an inert or reducing atmosphere at a drawing speed of 20 to 3000 m/min., to obtain continuous fiber. Alternatively, the oxynitride glass may be cooled from the melting temperature to 1100° to 1600° C. in a melting furnace of the drawing machine, to be drawn under an inert or reducing atmosphere. In the latter method, the raw materials for the oxynitride glass are continuously supplied by a feeder into the melting furnace of the drawing machine, to be directly drawn.

The glass fiber is preferably 3 to 50 μm in diameter. If the diameter is below this range, it is difficult to form fiber. If the diameter exceeds the above range, on the other hand, the glass fiber is extremely reduced in strength. The glass fiber may be continuous fiber, or short fiber of 1.5 to 100 mm. Further, the glass fiber may be in any form of cloth, roving, yarn, staple, a chopped strand, wool, paper or a mat.

Conventional glass, particularly oxynitride glass contains a number of Si particles and Si alloy particles not having any bonds with oxygen atoms. It is estimated that the conventional oxynitride glass is so colored and hazed that it is impossible to obtain glass fiber exhibiting expected excellent physical strength, due to such internal defects. On the other hand, the inventive oxynitride glass is not colored despite involving nitrogen, and has extremely high transmittance of at least 80%/mm in a visible region (400 to 800 nm in wavelength). In this glass, further, Si particles or Si alloy particles are reduced to not more than $1.0 \times 10^9/cm^3$ in number, and hence glass fiber which is obtained by drawing this glass is extremely superior in strength to the conventional glass fiber, and preferably applied to reinforcing fiber.

Preferable oxynitride glass obtained by the inventive method includes Si-Ca-M-O-N based or Si-Ca-Mg-M-O-N based glass, where M represents at least one metal selected from Al, Sr, La, Ba, Y, Ti, Zr, Ce, Na, K, Sb, B, Cr, Pb, V and Sn. The glass as obtained has a nitrogen content of 0.1 to 15 percent by weight, a elastic modulus of 10,000 to 22,000 $kg/mm^2$, and tensile strength of 100 to 700 $kg/mm^2$.

The foregoing and other objects, features, aspects and advantages of the present invention will become more apparent from the following detailed description of the present invention when taken in conjunction with the accompanying drawing.

DESCRIPTION OF THE PREFERRED EMBODIMENTS

Figure 1:
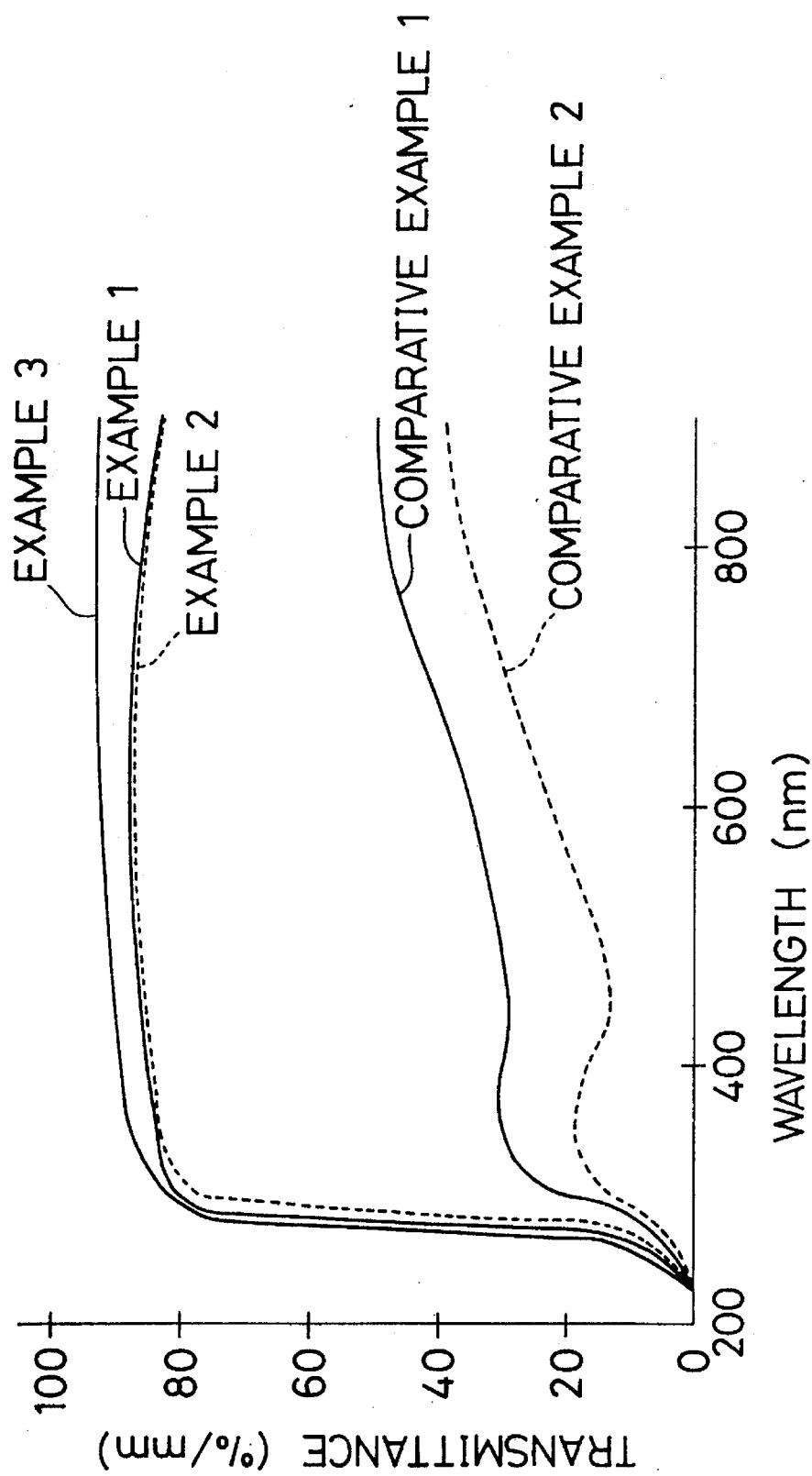
FIG. 1 is a graph showing transmittance values of glass samples according to Examples and comparative examples.

The present invention is now described in more concrete terms, with reference to Examples.

[EXAMPLE 1]

Powder materials of 50.31 percent by weight of $SiO_2$, 9.81 percent by weight of CaO, 11.54 percent by weight of MgO, 20.83 percent by weight of $Al_2O_3$ and 7.51 percent by weight of $Si_3N_4$ were employed as glass raw materials. 3 kg of a mixture of these raw materials was melted and refined in a carbon crucible of 24 cm by 15 cm by 10 cm which was lined with BN(Boron Nitride), under an atmosphere containing Ar and $N_2$ in a ratio of 1:9 at 1660° C. for 5 hours and at 1550° C. for 3 hours respectively. The glass as obtained was cooled, drawn out from the crucible, partially cut out and subjected to double optical polishing, and thereafter subjected to measurement of transmittance. FIG. 1 shows the result.

The above glass was pulverized, introduced into a molybdenum bushing, which was lined with BN, having 72 nozzle tips, entirely heated to 1600° C. under a nitrogen atmosphere, and discharged from the nozzle tips. It was possible to form glass fiber of 8.0 μm in mean fiber diameter by drawing the glass at 2000 m/min. The mean strength of this glass fiber was 420 kg/mm². Transmittance of this glass fiber was measured in the following method: 100 bundles of strands each of which includes 72 fibers were impregnated with epoxy resin containing carbon, and drawn into the form of a cylinder. The glass fiber reinforced epoxy resin was partially cut out along its section into a thickness of not more than 1 mm, and subjected to double optical polishing. An effective glass area was measured by an image processor, and the glass fiber was subjected to measurement of transmittance, similarly to the bulk glass. The glass fiber exhibited the same transmittance as the bulk glass.

[EXAMPLE 2]

Powder materials of 46.04 percent by weight of $SiO_2$, 9.32 percent by weight of CaO, 6.22 percent by weight of MgO, 25.90 percent by weight of $Al_2O_3$ and 12.52 percent by weight of $Si_3N_4$ were employed as glass raw materials. A mixture of these raw materials was melted and refined under an atmosphere containing He and $N_2$ in a ratio of 1:9 at 1680° C. for 5 hours and at 1580° C. for 3 hours respectively. This glass was cooled and drawn out, to be subjected to measurement of transmittance. FIG. 1 shows the result.

This glass was drawn similarly to Example 1, whereby the glass fiber as obtained exhibited mean strength of 450 kg/mm². The transmittance of this glass fiber was similar to that of the bulk glass.

[EXAMPLE 3]

Powder materials of 56.74 percent by weight of $SiO_2$, 10.42 percent by weight of MgO, 25.33 percent by weight of $Al_2O_3$ and 7.51 percent by weight of $Si_3N_4$ were employed as glass raw materials. A mixture of these raw materials was melted and refined under a nitrogen atmosphere at 1700° C. for 5 hours and at 1600° C. for 3 hours respectively. This glass was cooled and thereafter partially drawn out, to be subjected to measurement of transmittance. FIG. 1 shows the result.

This glass was drawn similarly to Example 1, whereby the glass fiber as obtained exhibited mean strength of 580 kg/mm². The transmittance of this glass fiber was similar to that of the bulk glass.

[COMPARATIVE EXAMPLE 1]

Oxynitride glass was prepared with compositions and conditions which were similar to those of Example 3, except that refinement was carried out at 1700° C. for 8 hours. The glass as obtained was partially drawn out and subjected to measurement of transmittance. FIG. 1 shows the result. The glass was drawn similarly to Example 1, to obtain extremely weak glass fiber having mean strength of 220 kg/mm². The transmittance of this glass fiber was similar to that of the bulk glass.

[COMPARATIVE EXAMPLE 2]

Powder materials of 51.24 percent by weight of $SiO_2$, 10.57 percent by weight of MgO, 25.68 percent by weight of $Al_2O_3$ and 12.52 percent by weight of $Si_3N_4$ were employed as glass raw materials. A mixture of these raw materials was melted and refined under a nitrogen atmosphere at 1750° C. for 8 hours and 1700° C. for 2 hours respectively. The glass as obtained was subjected to measurement of transmittance. FIG. 1 shows the result. The glass was drawn similarly to Example 1, to obtain glass fiber having low mean strength of 240 kg/mm². The transmittance of this glass fiber was similar to that of the bulk glass.

[EXAMPLE 4]

Raw materials of 50.31 percent by weight of $SiO_2$, 9.81 percent by weight of CaO, 11.54 percent by weight of MgO, 20.83 percent by weight of $Al_2O_3$ and 7.51 percent by weight of $Si_3N_4$ were employed as glass raw materials. 1 kg of a mixture of these raw materials was melted and refined at 1650° C. through a carbon crucible of 14 cm by 10 cm by 10 cm which was lined with BN, under an atmosphere containing Ar and $N_2$ in a ratio of 1:9. The melting and refining times were varied to count the number of Si particles contained in the glass by the following method. Table 1 shows the results.

Si Particle Counting Method:

The interior of an optically polished glass sample was observed with an optical microscope, the Si particles were counted in several portions, and the average number was obtained in terms of a unit observation volume per 1 cm³.

The glass as obtained was introduced into a molybdenum bushing, which was coated with chromium, having 36 nozzle tips, entirely heated to 1550° C., discharged from the nozzle tips, and drawn at 2000 m/min. The mean fiber diameter was 8.0 μm. Table 1 shows strength levels of the glass fiber as obtained.

TABLE 1

| Melting Time (hours) | Number of Si Particles of at least 0.1 μm ($\times 10^8/cm^3$) | Mean Strength (kg/mm²) |
|---|---|---|
| 1 | 15.1 | 220 |
| 4 | 9.5 | 350 |
| 8 | 3.0 | 420 |
| 16 | 2.2 | 430 |
| 24 | 1.1 | 450 |

As clearly understood from Table 1, it is conceivably effective to reduce Si particles of at least 0.1 μm to not more than $10 \times 10^8/cm^3$ in number.

[EXAMPLE 5]

Raw materials of 56.74 percent by weight of $SiO_2$, 10.42 percent by weight of MgO, 25.33 percent by weight of $Al_2O_3$ and 7.51 percent by weight of $Si_3N_4$ were employed as glass raw materials. 3 kg of a mixture of these raw materials was melted and refined in a molybdenum-tungsten crucible of 24 cm by 15 cm by 10 cm under a nitrogen atmosphere at 1720° C. for 6 hours and at 1600° C. for 2 hours respectively. The glass as obtained was cooled and Si particles contained therein were counted, to obtain a result of $1.8 \times 10^8/cm^3$. Glass fiber which was obtained by drawing this glass similarly to the above exhibited mean strength of 580 $kg/mm^2$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Oxynitride glass containing 0.1 to 15 percent by weight of nitrogen, and Si particles or Si alloy particles of at least 0.1 μm and not more than $1.0 \times 10^9/cm^3$ in number, said oxynitride glass having transmittance of at least 80%/mm at a wavelength of 400 to 800 nm.

2. Oxynitride glass in accordance with claim 1, being Si-Ca-M-O-N based or Si-Ca-Mg-M-O-N based glass, where M represents at least one of Al, Sr, La, Ba, Y, Ti, Zr, Ce, Na, K, Sb, B, Cr, Pb, V and Sn.

* * * * *